(12) United States Patent
Fang et al.

(10) Patent No.: US 10,824,013 B2
(45) Date of Patent: Nov. 3, 2020

(54) BACKLIGHT MODULE AND LIQUID CRYSTAL DISPLAY DEVICE

(71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Ming Fang, Beijing (CN); Wei Lei, Beijing (CN); Liangliang Zheng, Beijing (CN); Site Cai, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 0 days.

(21) Appl. No.: 16/691,168

(22) Filed: Nov. 21, 2019

(65) Prior Publication Data

US 2020/0089040 A1 Mar. 19, 2020

Related U.S. Application Data

(62) Division of application No. 15/736,269, filed as application No. PCT/CN2017/078482 on Mar. 29, 2017, now abandoned.

(30) Foreign Application Priority Data

Oct. 31, 2016 (CN) .......................... 2016 1 0928604

(51) Int. Cl.
*G02F 1/133* (2006.01)
*G02F 1/13357* (2006.01)
*G02B 27/28* (2006.01)

(52) U.S. Cl.
CPC ....... *G02F 1/13362* (2013.01); *G02B 27/283* (2013.01); *G02F 1/133606* (2013.01); *G02F 2001/133607* (2013.01)

(58) Field of Classification Search
CPC ........... G02F 1/13362; G02F 1/133606; G02B 27/283
See application file for complete search history.

(56) References Cited

U.S. PATENT DOCUMENTS

| 5,122,895 A | 6/1992 | Takanashi et al. |
| 5,221,982 A | 6/1993 | Faris |

(Continued)

FOREIGN PATENT DOCUMENTS

| CN | 1485649 A | 3/2004 |
| CN | 1952754 A | 4/2007 |

(Continued)

OTHER PUBLICATIONS

International Preliminary Report on Patentability received for PCT Patent Application No. PCT/CN2017/078482, dated May 9, 2019, 12 pages (7 pages of English Translation and 5 pages of Original Document).

(Continued)

*Primary Examiner* — James A Dudek
(74) *Attorney, Agent, or Firm* — Womble Bond Dickinson (US) LLP

(57) ABSTRACT

A backlight module and a liquid crystal display device are disclosed. The backlight module comprises a backlight source, a beam splitter and a light beam conversion portion. The beam splitter converts light from the backlight source into a first and second polarization light beam. The light beam conversion portion converts the first polarization light beam into a third polarization light beam through total reflection, and outputs the second and third polarization light (Continued)

beam through a light exit side. Alternatively, the light beam conversion portion converts the first and second polarization light beam into a fourth and fifth polarization light beam through total reflection, and outputs the fourth and fifth polarization light beam through the light exit side. To this end, light from the backlight source is efficiently applied to irradiate a liquid crystal display panel, and the brightness of the liquid crystal display panel significantly improves.

8 Claims, 6 Drawing Sheets

(56) References Cited

U.S. PATENT DOCUMENTS

| | | | |
|---|---|---|---|
| 5,359,455 | A | 10/1994 | Oishi |
| 5,387,953 | A | 2/1995 | Minoura et al. |
| 5,387,991 | A * | 2/1995 | Mitsutake ............ G02B 27/283 |
| | | | 349/1 |
| 5,422,756 | A | 6/1995 | Weber |
| 5,446,510 | A | 8/1995 | Mitsutake et al. |
| 5,748,369 | A | 5/1998 | Yokota |
| 5,995,284 | A | 11/1999 | Vanderwerf |
| 6,392,801 | B1 | 5/2002 | Southwell |
| 6,856,304 | B1 | 2/2005 | Hirakata et al. |
| 2002/0012169 | A1 | 1/2002 | Kashima |
| 2003/0137626 | A1 | 7/2003 | Khazova et al. |
| 2006/0274238 | A1 | 12/2006 | Yang |
| 2008/0001907 | A1 | 1/2008 | Bhowmik et al. |
| 2008/0094706 | A1 | 4/2008 | Wu |
| 2008/0123321 | A1 | 5/2008 | Hsu et al. |
| 2011/0069277 | A1 * | 3/2011 | Blixt ...................... A61B 3/113 |
| | | | 351/210 |
| 2012/0092589 | A1 | 4/2012 | Ma |
| 2016/0147092 | A1 | 5/2016 | Wagener et al. |
| 2017/0045206 | A1 * | 2/2017 | Yu ............................ F21L 4/00 |
| 2017/0082913 | A1 | 3/2017 | Aizaki |
| 2019/0004356 | A1 | 1/2019 | Fang et al. |

FOREIGN PATENT DOCUMENTS

| | | |
|---|---|---|
| CN | 102331628 A | 1/2012 |
| CN | 102454915 A | 5/2012 |
| CN | 106405933 A | 2/2017 |
| EP | 0492636 A1 | 7/1992 |
| JP | 2004-205665 A | 7/2004 |

OTHER PUBLICATIONS

International Search Report received for PCT Patent Application No. PCT/CN2017/078482, dated Aug. 4, 2017, 16 pages (3 pages of English Translation and 13 pages of Original Document).

Office Action received for Chinese Patent Application No. 201610928604.1, dated Jan. 18, 2019, 18 pages (9 pages of English Translation and 9 pages of Office Action).

Written Opinion received for PCT Patent Application No. PCT/CN2017/078482, dated Aug. 4, 2017, 9 pages (5 pages of English Translation and 4 pages of Original Document).

* cited by examiner

BACKLIGHT MODULE AND LIQUID CRYSTAL DISPLAY DEVICE

RELATED APPLICATIONS

This application is a divisional of application Ser. No. 15/736,269, filed on Dec. 13, 2017, which is the U.S. national phase entry of PCT/CN2017/078482, with an international filing date of Mar. 29, 2017 and claiming the benefit of Chinese Patent Application No. 201610928604.1, filed on Oct. 31, 2016, the entire disclosures of which are incorporated herein by reference.

TECHNICAL FIELD

The present disclosure relates to liquid crystal the field of display technology, and particularly to a backlight module and liquid crystal display device.

BACKGROUND

As shown in FIG. 1, a liquid crystal display device 1 comprises a liquid crystal display panel 10 and a backlight module 20. The liquid crystal display panel 10 for example is a thin film transistor liquid crystal display panel (TFT-LCD), and comprises a lower polarization sheet 11, an array substrate 12, a liquid crystal layer 13, a color film base plate 14, and an upper polarization sheet 15. A backlight source of the backlight module 20 generally emits a light which is natural light. When this light passes through the lower polarization sheet, the light intensity is lost by at least 50%, so that the utilization efficiency of the light emitted by the backlight source is low, and accordingly the liquid crystal display panel 10 has a low brightness. By increasing intensity of the emitted light of the backlight source, the brightness of the liquid crystal display panel 10 can improve, but this leads to high consumption of the liquid crystal display panel. An advanced polarizer film (APF) is arranged between the lower polarization sheet 11 and the backlight source, so that the polarized light which is not consistent with a transmission axis of the lower polarization sheet 11 is reflected backward to improve the utilization efficiency. However, APF can not directly convert the incident light from natural light into a linearly polarized light, and the light deviating from the transmission axis suffers from significant decay in intensity after reflections. Therefore, the utilization efficiency of light in the backlight module is low, and the liquid crystal display device has a low brightness. In addition, APF is expensive, making it difficult to reduce the cost of the backlight module.

SUMMARY

In an embodiment of the present disclosure, a backlight module is provided. The backlight module comprises a backlight source; a beam splitter, which is configured to convert light from the backlight source into a first polarization light beam and a second polarization light beam, wherein the first polarization light beam and the second polarization light beam are linearly polarized light with orthogonal polarization direction; and a light beam conversion portion, which is configured to convert the first polarization light beam into a third polarization light beam through total reflection, wherein the second polarization light beam and the third polarization light beams are linearly polarized light with identical polarization direction; or to convert the first polarization light beam and the second polarization light beam into a fourth polarization light beam and a fifth polarization light beam through total reflection, respectively, wherein the fourth polarization light beam and the fifth polarization light beam are linearly polarized light with identical polarization direction.

In the backlight module of this embodiment, the light of the backlight source is converted into the first and second polarization light beam, the light beam conversion portion further converts the first polarization light beam into the third polarization light beam which has a same polarization direction as the second polarization light beam, or converts the first and second polarization light beam into the fourth and fifth polarization light beam which have the identical polarization direction. To this end, light from the backlight source is efficiently used for irradiating the liquid crystal display panel, and brightness of the liquid crystal display panel significantly improves. As compared with a conventional liquid crystal display device in which a lower polarization sheet acts as a polarizer to allow 50% of light from the backlight source to pass, the backlight module significantly improves the light efficiency of the backlight source, so that the light of the backlight source is utilized efficiently. Since the third and second polarization light beam (or the fourth and fifth polarization light beam) which exit through the backlight module have an identical polarization direction, the lower polarization sheet which acts the polarizer in the conventional liquid crystal display panel can be omitted, and this simplifies the structure and reduces the cost of liquid crystal display panel.

In an exemplary embodiment, the beam splitter is a polarization beam splitter (PBS), and comprises a light-splitting incident surface, a first light-splitting exit surface which is adjacent with the light-splitting incident surface, a second light-splitting exit surface which is opposite to the light-splitting incident surface, and a beam-splitting reflection surface. Light from the backlight source is projected on the beam splitter through the light-splitting incident surface, and is subject to total reflection on the beam-splitting reflection surface to form the first polarization light beam, and is transmitted through the beam-splitting reflection surface to form the second polarization light beam. The first polarization light beam exits through the first light-splitting exit surface, and the second polarization light beam exits through the second light-splitting exit surface.

In the backlight module of this embodiment, light from the backlight source is converted by the polarization beam splitter, forming a reflected first polarization light beam (for example S linearly polarized light) and a transmitted second polarization light beam (for example P linearly polarized light). The first and second polarization light beams have polarization direction which are perpendicular with each other, and have result direction which are perpendicular with each other.

In an exemplary embodiment, the first polarization light beam exits from the beam splitter in a direction perpendicular with a direction in which the second polarization light beam exits from the beam splitter. For example, the beam splitter has a cross-section of square; and light from the backlight source is projected on the beam splitter in a direction perpendicular with the light-splitting incident surface.

In the backlight module of this embodiment, the first light-splitting exit surface and the beam-splitting reflection surface intersect at an angle $\varphi=45$ degrees. Moreover, the first polarization light beam and the second polarization light beam have a same intensity.

In an exemplary embodiment, the backlight module further comprises a collimator, which is arranged between the backlight source and the beam splitter.

In the backlight module of this embodiment, the light is collimated by the collimator and then projected on the beam splitter.

In an exemplary embodiment, the light beam conversion portion comprises a first polarization incident surface, a first polarization reflection surface, and a polarization exit surface, wherein the first polarization incident surface faces the first light-splitting exit surface, and is configured to receive the first polarization light beam which exits through the first light-splitting exit surface; the first polarization light beam is projected on the light beam conversion portion through the first polarization incident surface, and is subject to total reflection on the first polarization reflection surface to form the third polarization light beam; and the polarization exit surface is parallel with the second light-splitting exit surface, and the third polarization light beam exits through the polarization exit surface.

In the backlight module of this embodiment, the second light-splitting exit surface and the polarization exit surface form together a light exit surface of the backlight module.

In an exemplary embodiment, the first light-splitting exit surface of the beam splitter is closely bonded with the first polarization incident surface of the light beam conversion portion.

In the backlight module of this embodiment, the second and third polarization light beams are uniformly distributed on the light exit surface of the backlight module.

In an exemplary embodiment, the light beam conversion portion is a right angled isosceles prism; and the right angled isosceles prism comprises a first side surface and a second side surface which are perpendicular with each other and form the first polarization incident surface and the polarization exit surface, respectively, and comprises a third side surface which forms the first polarization reflection surface.

In the backlight module of this embodiment, the first polarization light beam passes through the light beam conversion portion, so that the result direction is rotated, and the resulting third polarization light beam has a result direction identical with that of the second polarization light beam.

In an exemplary embodiment, the exit surface of the backlight source has a dimension equal to that of the light-splitting incident surface of the beam splitter. In the backlight module of this embodiment, the exit surface La of the backlight source equals to the dimension Lb of the light-splitting incident surface. The second polarization light beam and third polarization light beam are uniformly distributed on the light exit surface of the backlight module, and the utilization efficiency of light from the backlight source is improved. If La>Lb, some light of the backlight source will not be directed into the beam splitter, so that the utilization efficiency of light from the backlight source reduces. If La<Lb, some region of the second light-splitting exit surface will not output the second polarization light beam, some region of the polarization exit surface will not output the third polarization light beam, and there is a gap between the second polarization light beam and the third polarization light beam. Namely, the polarization light beam is not output at some region the light exit surface of the backlight module.

In an exemplary embodiment, the first light-splitting exit surface has a dimension equal to that of the first polarization incident surface. In the backlight module of this embodiment, the first light-splitting exit surface has a dimension Lc equal to a dimension Ld of the first polarization incident surface. The second polarization light beam and third polarization light beam are uniformly distributed on the light exit surface of the backlight module, and the utilization efficiency of light from the backlight source is improved. In one aspect, if Ld>Lc, the third polarization light beam is not output at some region of the polarization exit surface. In another aspect, if Ld<Lc, the first polarization incident surface will not completely cover the first light-splitting exit surface, some of the first polarization light beam which exits through the first light-splitting exit surface will not enter the light beam conversion portion, so that the utilization efficiency of light from the backlight source reduces. Moreover, since the light beam conversion portion is a right angled isosceles prism, the dimension Ld equals to the dimension Le, so that the polarization exit surface through which the third polarization light beam exits and the second light-splitting exit surface through which the second polarization light beam exits have an identical dimension. This facilitates the outgoing light is uniformly distributed on the exit surface of the backlight module (i.e., the polarization exit surface and the second light-splitting exit surface). Moreover, the polarization exit surface is flush with the second light-splitting exit surface. This facilitates forming a flat exit surface of the backlight module.

In an exemplary embodiment, the light beam converter comprises a first polarization incident surface, a second polarization incident surface, a first polarization reflection surface, a second polarization reflection surface, and a polarization exit surface. The first polarization light beam is projected on the light beam conversion portion through the first polarization incident surface, is subject to total reflection on the first polarization reflection surface and the second polarization reflection surface in this order to form the fourth polarization light beam. The second polarization light beam is projected on the light beam conversion portion through the second polarization incident surface, and is subject to total reflection on the second polarization reflection surface to form the fifth polarization light beam. The fourth polarization light beam and the fifth polarization light beam exit through the polarization exit surface.

In the backlight module of this embodiment, the polarization exit surface of the light beam conversion portion constitutes the light exit surface of the backlight module.

In an exemplary embodiment, the first light-splitting exit surface of the beam splitter is closely bonded with the first polarization incident surface of the light beam conversion portion; and the second light-splitting exit surface of the beam splitter is closely bonded with the second polarization incident surface of the light beam conversion portion.

In the backlight module of this embodiment, the fourth polarization light beam and the fifth polarization light beam are uniformly distributed on the light exit surface of the backlight module.

In an exemplary embodiment, the first polarization incident surface and the first polarization reflection surface intersect at an angle of 45 degrees; the first polarization reflection surface and the second polarization reflection surface intersect at an angle of 90 degrees; and the second polarization incident surface and the second polarization reflection surface intersect at an angle of 45 degrees.

In the backlight module of this embodiment, the first polarization incident surface and the first polarization reflection surface have an intersection angle $\alpha=45$ degrees, the first polarization reflection surface and second polarization reflection surface have an intersection angle $\beta=90$ degrees, and the second polarization incident surface and the second polarization reflection surface have an intersection angle γ=45 degrees. The result direction of the first polarization light beam is rotated by 90 degrees after reflection from the first polarization reflection surface, and is further rotated by 90 degrees after reflection from the second polarization reflection surface, thus forming the fourth polarization light beam. The result direction of the second polarization light beam is rotated by 90 degrees after reflection from the second polarization reflection surface, thus forming the fifth polarization light beam. By projecting the first and second polarization light beam which are perpendicular with each other on the light beam conversion portion, the resulting fourth polarization light beam and fifth polarization light beam have an identical result direction.

In an exemplary embodiment, the first polarization light beam is subject to total reflection on the first polarization reflection surface and the second polarization reflection surface; and the second polarization light beam is subject to total reflection on the second polarization reflection surface. In the backlight module of this embodiment, the polarization direction of the polarization light beam is changed through total reflection. The first polarization light beam is subject to total reflection on both the first polarization reflection surface and the second polarization reflection surface, and the polarization direction is rotated by 90 degrees in each total reflection. The second polarization light beam is subject to total reflection on the second polarization reflection surface, and the polarization direction is rotated by 90 degrees. The first polarization light beam and the second polarization light beam, which have a difference in polarization direction of 90 degrees, have the identical polarization direction after passing through the light beam conversion portion.

In an exemplary embodiment, the exit surface of the backlight source has a dimension equal to that of the light-splitting incident surface of the beam splitter. In the backlight module of this embodiment, the exit surface of the backlight source has a dimension La which is equal to a dimension Lb of the light-splitting incident surface. The fourth polarization light beam and the fifth polarization light beam are uniformly distributed on the light exit surface of the backlight module, and the utilization efficiency of light from the backlight source is improved. If La>Lb, some light of the backlight source will not be directed into the beam splitter, so that the utilization efficiency of light from the backlight source reduces. If La<Lb, some region of the polarization exit surface will not output the fourth polarization light beam and the fifth polarization light beam, and there is a gap between the fourth polarization light beam and the fifth polarization light beam. Namely, the polarization light beam is not output in some region of the light exit surface of the backlight module.

In an exemplary embodiment, the first light-splitting exit surface has a dimension equal to that of the first polarization incident surface; and the second light-splitting exit surface has a dimension equal to that of the second polarization incident surface. In the backlight module of this embodiment, the dimension Lc of the first light-splitting exit surface equals to the dimension Ld of the first polarization incident surface, and the dimension Lb of the second light-splitting exit surface equals to the dimension Lf of the second polarization incident surface. The fourth polarization light beam and the fifth polarization light beam are uniformly distributed on the light exit surface of the backlight module, and the utilization efficiency of light from the backlight source is improved. In one aspect, if Ld>Lc or Lf>Lb, some region of polarization exit surface will not output the fourth polarization light beam and the fifth polarization light beam, and there is a gap between the fourth polarization light beam and the fifth polarization light beam. In another aspect, if Ld<Lc, the first polarization incident surface will not completely cover the first light-splitting exit surface, and some of the first polarization light beam which exits through the first light-splitting exit surface will not enter the light beam conversion portion. Similarly, if Lf<Lb, the second polarization incident surface will not completely cover the second light-splitting exit surface, and some of the second polarization light beam which exits through the second light-splitting exit surface will not enter the light beam conversion portion. As a result, light from the backlight source is not utilized efficiently.

In an exemplary embodiment, the polarization exit surface has a dimension which is twice that of the second polarization incident surface. In the backlight module of this embodiment, a dimension Le of the polarization exit surface is twice of a dimension Lf of the second polarization incident surface, i.e., Le=2Lf. The fourth polarization light beam and the fifth polarization light beam occupy a half region of the polarization exit surface, respectively. This enables a uniformly distribution of outgoing light to be provided on the exit surface (polarization exit surface) of the backlight module.

In an exemplary embodiment, the backlight source comprises a light emitting diode or a cold cathode fluorescence lamp. In the backlight module of this embodiment, these light sources provide light which is close to natural light, i.e., completely non-polarized light. As a result, after passing the polarization beam splitter, the first polarization light beam and the second polarization light beam with an identical intensity are obtained, and the outgoing light has an intensity which is uniformly distributed on the exit surface of the backlight module.

In an exemplary embodiment, the light beam conversion portion is made from a transparent material and has a refractive index of 1.414.

In the backlight module of this embodiment, the light beam conversion portion has a refractive index of 1.414, so that the polarization light beam is subject to total reflection on the first polarization reflection surface and the second polarization reflection surface of the light beam conversion portion, and the polarization direction is rotated by 90 degrees, i.e., polarization light beam is converted from S linearly polarized light into P linearly polarized light, or from P linearly polarized light convert into S linearly polarized light.

In an embodiment of the present disclosure a liquid crystal display device, which comprises a liquid crystal display panel and the backlight module as described above.

The liquid crystal display device in this embodiment of the present disclosure has identical or similar beneficial effects with the backlight module as described above, which are not repeated here.

These drawings and verbal description do not intend to limit the scope of the present inventive concept, but to convey the present inventive concept to the person with ordinary skill in the art with reference to specific embodiments.

BRIEF DESCRIPTION OF THE DRAWINGS

In order to explain the technical solutions in the embodiments of the present disclosure or the prior art more clearly, the drawings to be used in the description of the embodiments or the prior art will be introduced briefly in the following. Apparently, the drawings described below are only some embodiments of the present disclosure.

Figure 1:
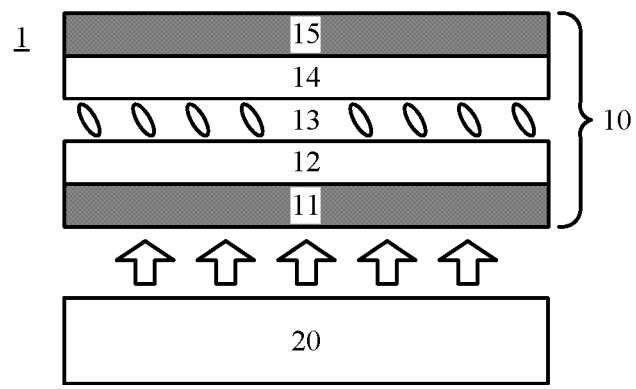
FIG. 1 is a schematic view for illustrating a liquid crystal display device.

These drawings and verbal description do not intend to limit the scope of the present inventive concept, but to convey the present inventive concept to the person with ordinary skill in the art with reference to specific embodiments.

DETAILED DESCRIPTION OF EMBODIMENTS

To make the objects, the technical solutions and the advantages of embodiments of the present disclosure more apparent, the technical solutions of the embodiments of the present disclosure will be described in detail hereinafter in conjunction with the drawings of the embodiments of the present disclosure.

REFERENCE NUMERALS

1, 2, 5: liquid crystal display device;
10, 100: liquid crystal display panel;
11: lower polarization sheet;
12, 120: array substrate;
13, 130: liquid crystal layer;
14, 140: color film base plate;
15, 150: upper polarization sheet;
20, 200, 500: backlight module;
210: backlight source;
220: diffusion part;
230: prism part;
240: polarization beam splitter;
241: light-splitting incident surface;
242: first light-splitting exit surface;
243: second light-splitting exit surface;
244: beam-splitting reflection surface;
250, 550: light beam conversion portion;
251, 551: first polarization incident surface;
552: second polarization incident surface;
253, 553: first polarization reflection surface;
554: second polarization reflection surface;
255, 555: polarization exit surface;
La: dimension of exit surface of backlight source;
Lb: dimension of light-splitting incident surface and second light-splitting exit surface of beam splitter;
Lc: dimension of first light-splitting exit surface of beam splitter;
Ld: dimension of first polarization incident surface of light beam conversion portion;
Le: dimension of polarization exit surface of light beam conversion portion;
Lf: dimension of second polarization incident surface of light beam conversion portion;
$\varphi$: intersection angle between first light-splitting exit surface and beam-splitting reflection surface;
$\alpha$: intersection angle between first polarization incident surface and first polarization reflection surface;
$\beta$: intersection angle between first polarization reflection surface and second polarization reflection surface;
$\gamma$: intersection angle between second polarization incident surface and second polarization reflection surface; and
P, P', P'', P''', P1, P1', P1'', P1''', P2, P2', P2'', P2''', P3, P3', P3'', P3''', P4, P4', P4'', P4''', P5, P5', P5'', P5''': light.

Embodiment of the backlight module and the liquid crystal display device will be described hereinafter with reference to the accompanying drawings.

Figure 2:
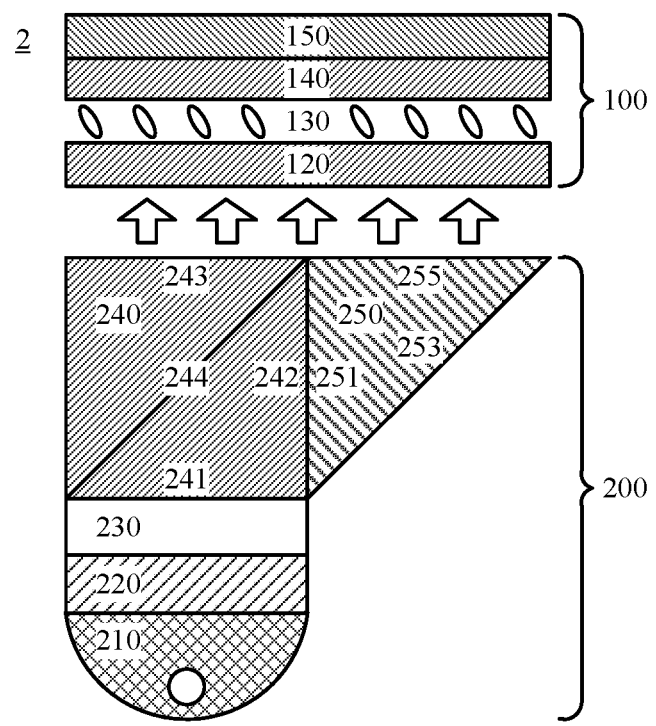
FIG. 2 is a structural view for illustrating a liquid crystal display device in an embodiment of the present disclosure.
Figure 3A:
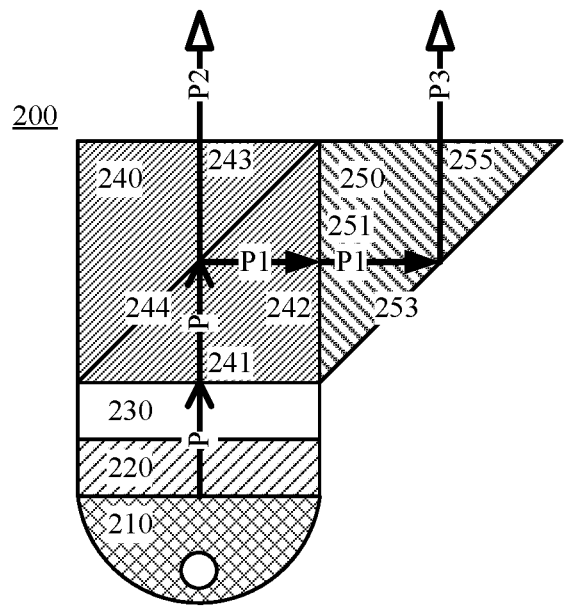
FIG. 3A is a light path for illustrating conversion of natural light into linearly polarized light in a backlight module in an embodiment of the present disclosure.
Figure 3B:
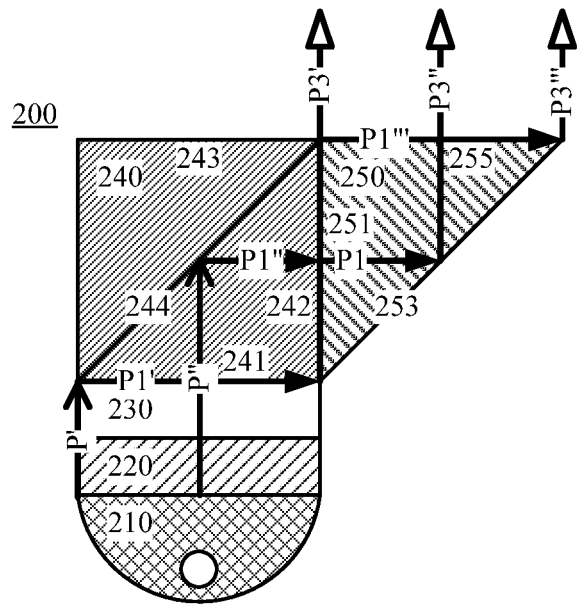
FIG. 3B is a reflected light path in a backlight module in an embodiment of the present disclosure.
Figure 3C:
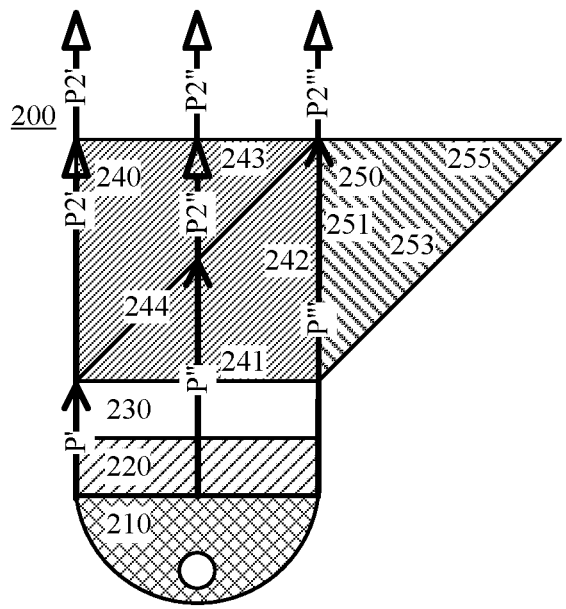
FIG. 3C is a transmitted light path in a backlight module in an embodiment of the present disclosure.
Figure 4:
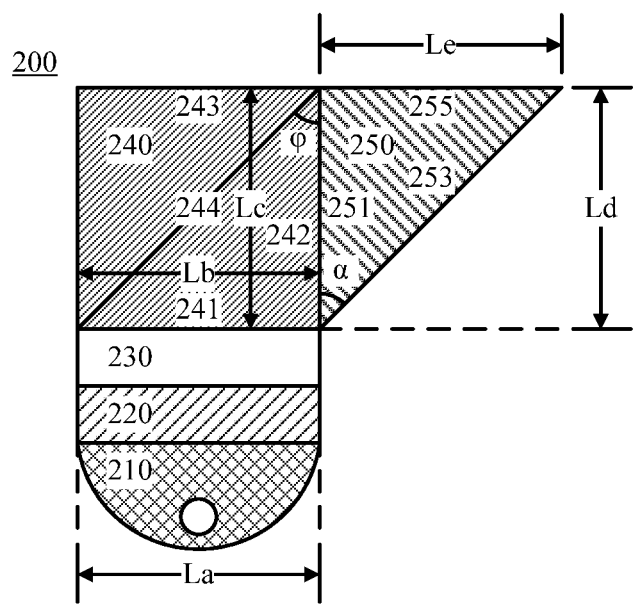
FIG. 4 is a structural view for illustrating a backlight module in an embodiment of the present disclosure.

Referring to FIGS. 2, 3A, 3B, 3C, 4, a liquid crystal display device and a backlight module in embodiments of the present disclosure is elucidated. FIG. 2 schematically shows a liquid crystal display device in an embodiment of the present disclosure. FIG. 3A schematically shows a light path of converting natural light into linearly polarized light in a backlight module in an embodiment of the present disclosure. FIG. 3B and FIG. 3C schematically show a reflected light path and a transmitted light path in a backlight module according to an embodiment of the present disclosure. FIG. 4 schematically shows a backlight module according to an embodiment of the present disclosure.

As shown in FIG. 2, a liquid crystal display device 2 comprises a liquid crystal display panel 100 and a backlight module 200 which provides backlight for the liquid crystal display panel 100. The backlight module 200 comprises a backlight source 210, a beam splitter 240 and a light beam conversion portion 250. The beam splitter 240 and the light beam conversion portion 250 are arranged between the backlight source 210 and the liquid crystal display panel 100, for guiding light from the backlight source 210 to the liquid crystal display panel 100.

As shown in FIG. 3A, the backlight module 200 comprises the backlight source 210; the beam splitter 240, which is configured to convert a light P from the backlight source 210 into a first polarization light beam P1 and a second polarization light beam P2 which are linearly polarized light with polarization direction being perpendicular with each other; and the light beam conversion portion 250, which is configured to convert the first polarization light beam P1 into a third polarization light beam P3 through total reflection, wherein the second polarization light beam P2 and the third polarization light beam P3 are linearly polarized light with identical polarization direction. The second polarization light beam P2 exits through a light exit side of a polarization the beam splitter 240, and the third polarization light beam P3 exits through a light exit side of the light beam conversion portion 250. To this end, both the first polarization light beam P1 and the second polarization light beam P2 from the backlight source 210 are efficiently used to irradiate the liquid crystal display panel 100, the utilization efficiency of light from the backlight source 210 is improved, and the brightness of the liquid crystal display panel 100 significantly improves.

When the first polarization light beam P1 is subject to total reflection in the light beam conversion portion 250 to form the third polarization light beam P3, the result direction is changed at the same time. Thus, by appropriately configuring the light beam conversion portion 250, the third polarization light beam P3 has an identical result direction with the second polarization light beam P2. Namely, under appropriate circumstances, the polarization direction and the result direction of the first polarization light beam P1 are changed at the same time through total reflection in the light beam conversion portion 250, and the first polarization light beam P1 is converted into the third polarization light beam P3 which has an identical polarization direction and result direction with the second polarization light beam P2. The second polarization light beam P2 and the third polarization light beam P3 exits through a light exit side of the backlight module 200. According to this embodiment, both polarization direction and result direction of the polarization light beam are changed at the same time by means of total reflection of polarization light beam by the light beam conversion portion 250.

Details of the liquid crystal display device and the backlight module according to embodiments of the present disclosure are described hereinafter.

As shown in FIG. 2, the liquid crystal display panel 100 comprises an array substrate 120, a liquid crystal layer 130, a color film base plate 140, and an upper polarization sheet 150. As stated above, the second polarization light beam P2 and the third polarization light beam P3 exiting from the light exit side of the backlight module 200 have an identical polarization direction. Thus, in principle, the backlight from the backlight module 200 can be directly used to realize the display function of the liquid crystal display panel 100, and it is not necessary to provide the lower polarization sheet. Namely, in contrast with the liquid crystal display panel 10 shown in FIG. 1, the liquid crystal display panel 100 in this embodiment does not comprise the lower polarization sheet. It is noted that, the liquid crystal display panel 100 may also comprise the lower polarization sheet, in order to eliminate a component of backlight the polarization direction of which has been changed prior to reaching the liquid crystal display panel due to result in the backlight module.

As shown in FIG. 2 and FIG. 3A, in an exemplary embodiment, the beam splitter 240 is a polarization beam splitter (also referred to as a polarization light splitting prism), and converts the light from the backlight source 210 into the first polarization light beam P1 and the second polarization light beam P2. For example, the beam splitter 240 comprises a light-splitting incident surface 241, a first light-splitting exit surface 242 which is adjacent with the light-splitting incident surface 241, a second light-splitting exit surface 243 which is opposite to the light-splitting incident surface 241, and a beam-splitting reflection surface 244.

In particular, as shown in FIG. 3A, the light P from the backlight source 210 is projected on the beam splitter 240 through the light-splitting incident surface 241, is subject to total reflection on the beam-splitting reflection surface 244 to form the first polarization light beam P1, and is transmitted through the beam-splitting reflection surface 244 to form the second polarization light beam P2. The first polarization light beam P1 exits through the first light-splitting exit surface 242, and the second polarization light beam P2 exits through the second light-splitting exit surface 243. As an example, the first polarization light beam P1 is a linearly polarized light with polarization direction being perpendicular with the incident surface, i.e., S linearly polarized light, and the second polarization light beam P2 is a linearly polarized light with polarization direction parallel with the incident surface, i.e., P linearly polarized light. In this context, the polarization beam splitter is taken as an example of the beam splitter. However, the present disclosure embodiment is not limited to this. In other embodiments, the beam splitter 240 is any optical element or any combination of optical elements which converts an incident light such as natural light into S linearly polarized light and P linearly polarized light with different result direction.

Generally, the polarization the beam splitter 240 has a cross-section of square, i.e., the first light-splitting exit surface 242 and the beam-splitting reflection surface 244 intersect at an angle φ of 45 degrees, as shown in FIG. 4. For example, the light P from the backlight source 210 is projected on the polarization the beam splitter 240 in a direction perpendicular with the light-splitting incident surface 241. In this case, the polarization the beam splitter 240 provides the first polarization light beam P1 and the second polarization light beam P2 which have an identical intensity but orthogonal polarization direction.

In an exemplary embodiment, the backlight source 210 is a light emitting diode or cold cathode fluorescence lamp. These light sources provide a light which is close to natural light, i.e., completely non-polarized light. As a result, after passing through the polarization the beam splitter 240, the first polarization light beam P1 and the second polarization light beam P2 with an identical intensity are obtained, and an outgoing light with a uniformly distributed intensity is obtained at an exit surface of the backlight module 200.

In an exemplary embodiment, the backlight module further comprises a collimator, which is arranged between the backlight source and the beam splitter. In this way, the light projected toward the beam splitter is collimated light, which can further improve the brightness and uniformity of light from the backlight module.

As shown in FIG. 2 and FIG. 3A, the light beam conversion portion 250 comprises a first polarization incident surface 251, a first polarization reflection surface 253 and a polarization exit surface 255. The first polarization incident surface faces a first light-splitting exit surface of the beam splitter, and is configured to receive the first polarization light beam which exits through the first light-splitting exit surface. The first polarization light beam P1 is incident on the light beam conversion portion 250 through the first polarization incident surface 251, and is subject to total reflection in the first polarization reflection surface 253 to form the third polarization light beam P3. The polarization exit surface 255 is parallel with the second light-splitting exit surface 243, and the third polarization light beam P3 exits through the polarization exit surface 255.

Result of light in the backlight module 200 will be described in details by referring to FIG. 3B and FIG. 3C. In FIG. 3A, a bifurcated arrow indicates natural light, e.g. P, a solid arrow indicates S linearly polarized light, e.g. P1, and a hollow arrow indicates P linearly polarized light, e.g. P2 and P3. Similar arrows are used in FIGS. 3B-3C and other figures. It is noted that, three light P', P'', P''' are used in FIG. 3B and FIG. 3C to replace the light P from the backlight source 210 in FIG. 3A. This is only schematic, and intends to clearly elucidate the result path of respective light in the backlight module 200. It is further noted that, only for sake of clarity, result path of light from the backlight source 210 after reflection and transmission at the beam-splitting reflection surface 244 are shown in FIG. 3B and FIG. 3C.

As shown in FIG. 3B, the natural light P', P'', P''' from the backlight source 210 is projected on the polarization beam splitter 240 through the light-splitting incident surface 241, is reflected on the beam-splitting reflection surface 244 to form the first polarization light beam P1', P1", P1''' (S linearly polarized light), and exits the polarization beam splitter 240 through the first light-splitting exit surface 242. Then, the first polarization light beam P1', P1", P1''' is projected on the light beam conversion portion 250 through the first polarization incident surface 251, is reflected on the first polarization reflection surface 253 to form the third polarization light beam P3', P3", P3''' (P linearly polarized light), and exits the light beam conversion portion 250 through the polarization exit surface 255.

As shown in FIG. 3C, the natural light P', P", P''' from the backlight source 210 is projected on the polarization the beam splitter 240 through the light-splitting incident surface 241, is transmitted through the beam-splitting reflection surface 244 to form the second polarization light beam P2', P2", P2'''(P linearly polarized light), and exits the polarization the beam splitter 240 through the second light-splitting exit surface 243.

As shown in FIG. 3B and FIG. 3C, the second polarization light beam P2', P2", P2''' exits the backlight module 200 through the second light-splitting exit surface 243, and the third polarization light beam P3', P3", P3''' exits the backlight module 200 through the polarization exit surface 255. In this case, the second light-splitting exit surface 243 of the polarization the beam splitter 240 and the polarization exit surface 255 of the light beam conversion portion 250 form together the light exit surface of the backlight module 200. As shown in FIGS. 3B-3C, both the second polarization light beam P2', P2", P2''' which exits through the second light-splitting exit surface 243 and the third polarization light beam P3', P3", P3''' exit through the polarization exit surface 255 are P linearly polarized light, i.e., have an identical polarization direction. For example, when there is a gap between the first light-splitting exit surface 242 and the first polarization incident surface 251, there will be a gap between the third polarization light beam P3' shown in FIG. 3B and the second polarization light beam P2''' shown in FIG. 3C. As a result, there will be a gap between the second polarization light beam P2 which exits through the second light-splitting exit surface 243 and the third polarization light beam P3 which exits through the polarization exit surface 255, and no polarization light beam is output at the gap. Therefore, as shown in FIG. 3B and FIG. 3C, the first light-splitting exit surface 242 of the beam splitter 240 is closely bonded with the first polarization incident surface 251 of the light beam conversion portion 250, so that the second polarization light beam P2 and the third polarization light beam P3 are uniformly distributed on the light exit surface of the backlight module 200. This provides a single linearly polarized light which is uniformly distributed on the light exit surface of the backlight module 200.

As shown in FIG. 2, FIGS. 3A-3C and FIG. 4, the light beam conversion portion 250 is a right angled isosceles prism. The right angled isosceles prism comprises a first side surface and a second side surface which are perpendicular with each other, and a third side surface. The first side surface and the second side surface form the first polarization incident surface 251 and the polarization exit surface 255, and the third side surface forms the first polarization reflection surface 253. The first polarization incident surface 251 and the first polarization reflection surface 253 intersect at an angle of 45 degrees. In this embodiment, after the first polarization light beam P1', P1", P1''' passes through the light beam conversion portion 250, the result direction is rotated by 90 degrees, and the result direction of the resulting third polarization light beam P3', P3", P3''' is identical with that of the second polarization light beam P2', P2", P2'''.

Thus, the second polarization light beam P2', P2", P2''' and the third polarization light beam P3', P3", P3''' can be directly used as the backlight of the liquid crystal display panel 100, and there is no need to arrange a light guide plate between the backlight module 200 and the liquid crystal display panel 100.

For example, the light beam conversion portion 250 is formed by a transparent material with a refractive index of 1.414. When the light beam conversion portion 250, i.e., the right angled isosceles prism, has a refractive index of 1, the first polarization light beam P', P1", P1''' (S linearly polarized light) is subject to total reflection on the first polarization reflection surface 253, and a phase difference of $\pi$ is introduced to form P linearly polarized light, i.e., the third polarization light beam P3', P3", P3''', as shown in FIG. 3B. Thereby, by means of a right angled isosceles prism with a specific refractive index, both result direction and polarization direction of the first polarization light beam P1 are rotated by 90 degrees at the same time.

The setting of a dimension for the exit surface of the backlight source and a dimension for the light-splitting incident surface of the beam splitter will be described with reference to FIG. 4. The dimension as used herein refers to a dimension of each element in the cross-sectional view as shown, e.g., a length or a width. As shown, the exit surface of the backlight source 210 has a dimension La which is equal to a dimension Lb of the light-splitting incident surface 241 of the beam splitter 240.

As for La>Lb, some light from the backlight source 210 will not be directed into the beam splitter 240, so that the utilization efficiency of light from the backlight source 210 reduces. By setting La=Lb, the utilization efficiency of light from the backlight source 210 is improved.

As for La<Lb, in a first case in which there is a gap Lb−La between the natural light P' and a left end of the light-splitting incident surface 241, there will be a gap Lb−La between the third polarization light beam P3' and the left end of the polarization exit surface 255 (i.e., the first polarization incident surface 251). As a result, the third polarization light beam P3' is not output from the polarization exit surface 255 at the gap (i.e., there is a gap between Lb−La between the third polarization light beam P3' and the second polarization light beam P2'''). In a second case in which there is a gap Lb−La between the natural light P''' and the right end of the light-splitting incident surface 241 (i.e., the first light-splitting exit surface 242), there will be a gap Lb−La between the third polarization light beam P3''' and the right end of the polarization exit surface 255. As a result, the third polarization light beam P3''' is not output from the polarization exit surface 255 at the gap. In both cases, light is not uniformly distributed on the light exit surface of the backlight module 200. By setting La=Lb, the light exit surface of the backlight module 200 has a uniform light distribution.

The setting of a dimension Lc for the first light-splitting exit surface 242 of the polarization beam splitter 240 and a dimension Ld for the first polarization incident surface 251 of the light beam conversion portion 250 will be described with reference to FIG. 4. As shown in FIG. 4, the dimension Lc of the first light-splitting exit surface 242 equals to the dimension Ld of the first polarization incident surface 251.

Similar with the setting as discussed above, when Ld<Lc, the first polarization incident surface 251 can not completely cover the first light-splitting exit surface 242, some of the first polarization light beam P1 which exits through the first light-splitting exit surface 242 will not enter the light beam conversion portion 250, so that the utilization efficiency of light from the backlight source reduces. In addition, when Ld>Lc, the third polarization light beam P3' is not output at the left end of the polarization exit surface 255, or the third polarization light beam P3''' is not output at the right end. This leads to non-uniform distribution of light on the light exit surface of the backlight module 200. Thus by setting Lc=Ld, the utilization efficiency of light from the backlight source 210 is improved, and the light exit surface of the backlight module 200 has a uniform distribution of light.

When the light beam conversion portion 250 is a right angled isosceles prism, the dimension Ld of the first polarization incident surface 251 equals to the dimension Le of the polarization exit surface 255. In this case, the polarization exit surface 255 through which the third polarization light beam P3 exits and the second light-splitting exit surface 243 through which the second polarization light beam P2 exits have identical dimension, This facilitates the outgoing light is uniformly distributed on the exit surface of the backlight module 200 (i.e., the polarization exit surface 255 and the second light-splitting exit surface 243). Moreover, the polarization exit surface 255 is flush with the second light-splitting exit surface 243. This facilitates forming a flat exit surface of the backlight module 200.

In an exemplary embodiment, the backlight module 200 further comprises other light beam modifying elements. For example, the backlight module 200 comprises a diffusion part 220, which is arranged in a light path of the backlight source 210, and diffuses light from the backlight source 210 to improve light uniformity. For example, the backlight module 200 comprise a prism part 230, which is arranged between the diffusion part 220 and the beam splitter 240, and collects light diffused by the diffusion part 220 to improve the intensity of output light.

Figure 5:
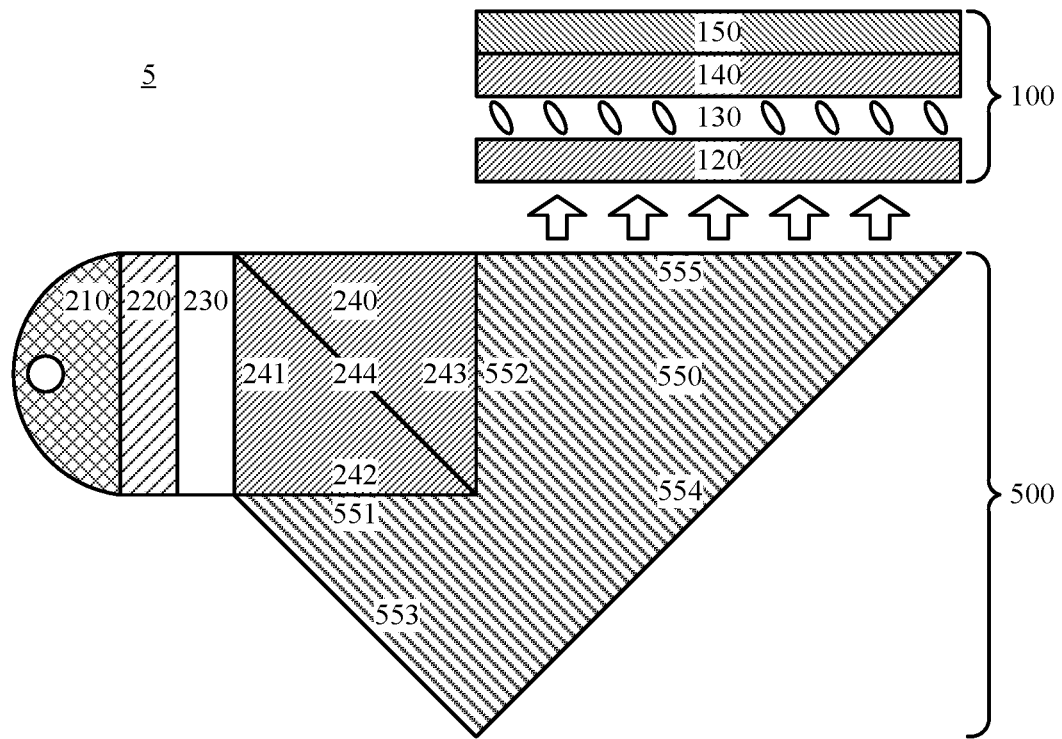
FIG. 5 is a structural view for illustrating a liquid crystal display device in an embodiment of the present disclosure.
Figure 6A:
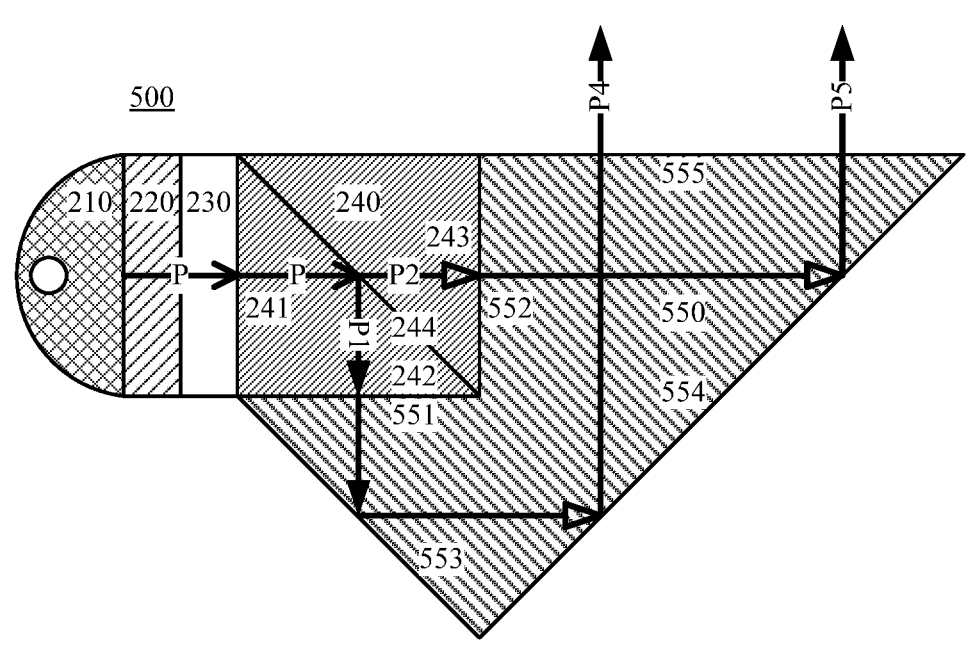
FIG. 6A is a light path for illustrating conversion of natural light into linearly polarized light in a backlight module in an embodiment of the present disclosure.
Figure 6B:
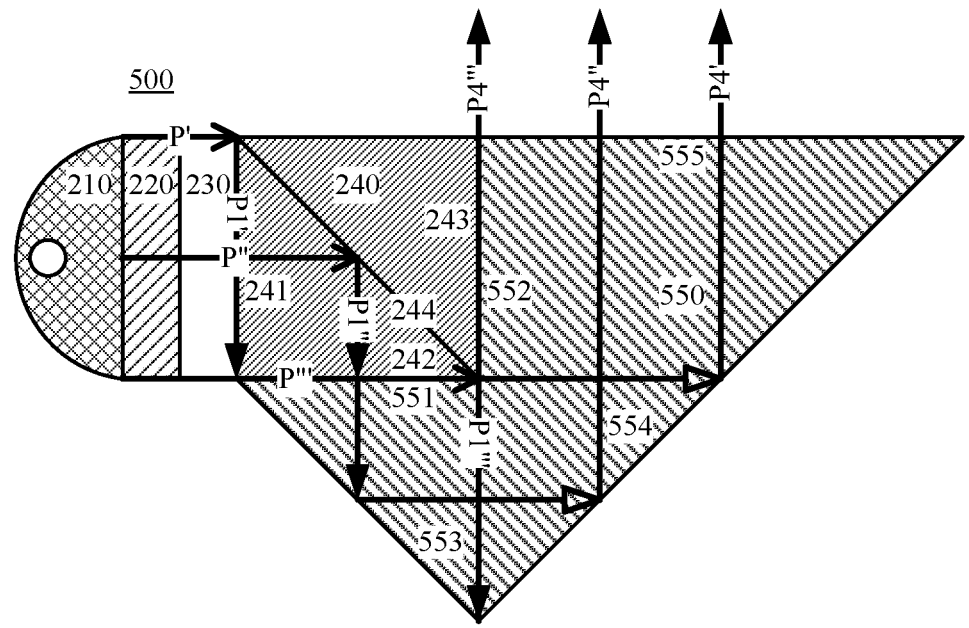
FIG. 6B is a reflected light path in a backlight module in an embodiment of the present disclosure.
Figure 6C:
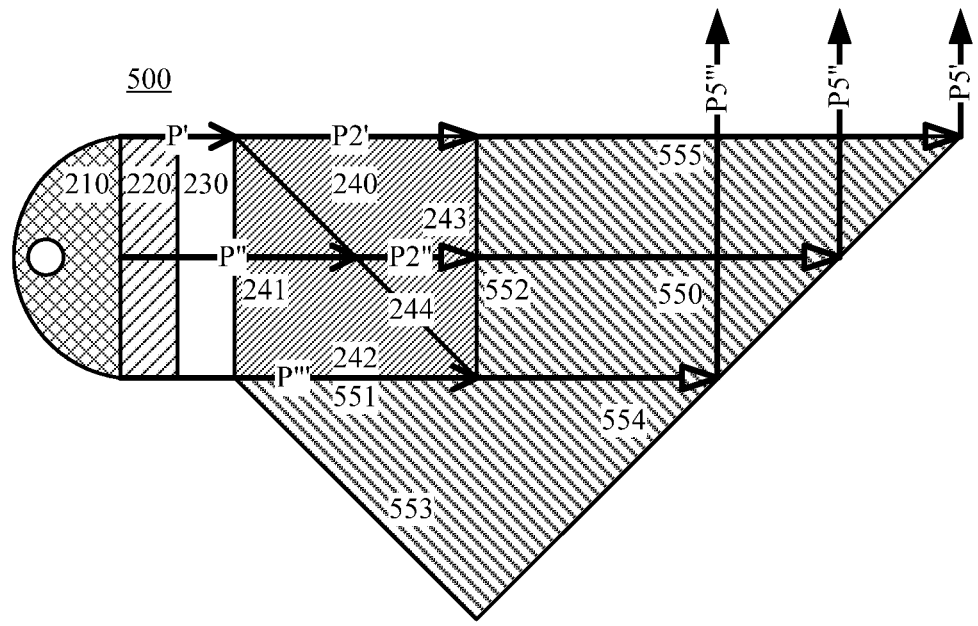
FIG. 6C is a transmitted light path in a backlight module in an embodiment of the present disclosure.
Figure 7:
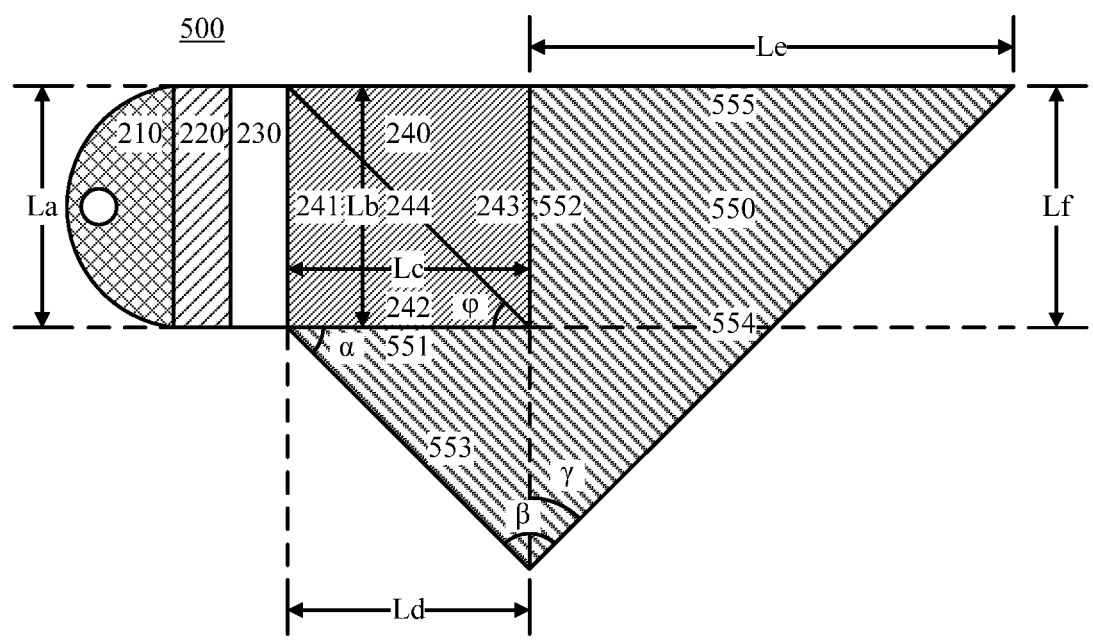
FIG. 7 is a structural view for illustrating a backlight module in an embodiment of the present disclosure.

The liquid crystal display device and the backlight module according to embodiments of the present disclosure will be described by referring to FIGS. 5, 6A, 6B, 6C, 7. FIG. 5 schematically shows a liquid crystal display device according to an embodiment of the present disclosure. FIG. 6A schematically shows a light path for converting natural light into linearly polarized light in a backlight module according to an embodiment of the present disclosure. FIG. 6B and FIG. 6C schematically show a reflected light path and a transmitted light path in a backlight module according to an embodiment of the present disclosure. FIG. 7 schematically shows a backlight module according to an embodiment of the present disclosure.

For sake of simplicity, when the liquid crystal display device and the backlight module are described with reference to FIGS. 5, 6A, 6B, 6C, 7, only the difference from the liquid crystal display device and the backlight module shown in FIGS. 2, 3A, 3B, 3C, 4 will be described.

As shown in FIG. 5, a liquid crystal display device 5 comprises the liquid crystal display panel 100 and a backlight module 500. The backlight module 500 comprises the backlight source 210, the beam splitter 240 and a light beam conversion portion 550.

As shown in FIG. 6A, the backlight module 500 comprises the backlight source 210; the beam splitter 240, which is configured to convert light from the backlight source 210 P into the first polarization light beam P1 and the second polarization light beam P2; and the light beam conversion portion 550, which is configured to convert the first polarization light beam P1 and the second polarization light beam P2 into a fourth polarization light beam P4 and a fifth polarization light beam P5 through total reflection, wherein the fourth polarization light beam P4 and the fifth polarization light beam P5 are linearly polarized light with identical polarization direction. The fourth polarization light beam P4 and the fifth polarization light beam P5 exit through the light exit side of the light beam conversion portion 550. To this end, both the first polarization light beam P1 and the second polarization light beam P2 from the backlight source 210 are efficiently used to irradiate the liquid crystal display panel 100, the utilization efficiency of light from the backlight source 210 is improved, and the brightness of the liquid crystal display panel 100 significantly improves. Similar with FIG. 3A, for example, the first polarization light beam P1 is a linearly polarized light in which the polarization direction is perpendicular with the incident surface, i.e., S linearly polarized light, and the second polarization light beam P2 is a linearly polarized light in which the polarization direction is parallel with the incident surface, i.e., P linearly polarized light.

The first polarization light beam P1 and the second polarization light beam P2 are subject to total reflection in the light beam conversion portion 550 to form the fourth polarization light beam P4 and the fifth polarization light beam P5, the result direction is changed at the same time. Thus, by appropriately configuring the light beam conversion portion 550, the fourth polarization light beam P4 has an identical result direction with the fifth polarization light beam P5. Namely, under appropriate circumstances, the polarization direction and the result direction of the first polarization light beam P1 and the second polarization light beam P2 are changed at the same time through total reflection in the light beam conversion portion 550, and then are converted into the fourth polarization light beam P4 and the fifth polarization light beam P5 with identical polarization direction and result direction. The fourth polarization light beam P4 and the fifth polarization light beam P5 exit through the light exit side of the backlight module 500. According to this embodiment, both polarization direction and result direction of the polarization light beam are changed at the same time by means of total reflection of polarization light beam by the light beam conversion portion 550.

Similar with FIGS. 3A, 3B and 3C, the bifurcated arrow in FIGS. 6A, 6B and 6C indicates natural light, the solid arrow indicates S linearly polarized light, and the hollow arrow indicates P linearly polarized light. As shown in FIG. 5 and FIG. 6A, the light beam conversion portion 550 comprises a first polarization incident surface 551, a second polarization incident surface 552, a first polarization reflection surface 553, a second polarization reflection surface 554 and a polarization exit surface 555. The first polarization light beam P1 is projected on the light beam conversion portion 550 through the first polarization incident surface 551, is subject to total reflection on the first polarization reflection surface 553 and the second polarization reflection surface 554 in this order to form the fourth polarization light beam P4. The second polarization light beam P2 is projected on the light beam conversion portion 550 through the second polarization incident surface 552, and is subject to total reflection on the second polarization reflection surface 554 to form the fifth polarization light beam P5. In this embodiment, the fourth polarization light beam P4 and the fifth polarization light beam P5 exit the polarization exit surface 555 of through the light beam conversion portion 550, i.e., the polarization exit surface 555 constitutes the light exit surface of the backlight module 500.

Light result in the backlight module 500 will be described in details with reference to FIG. 6B and FIG. 6C. Similarly, only for sake of simplicity, result path of light from the backlight source 210 after reflection and transmission on the beam-splitting reflection surface 244 are shown in FIG. 6B and FIG. 6C, respectively.

As shown in FIG. 6B, the natural light P', P'', P''' from the backlight source 210 is projected on the polarization the beam splitter 240 through the light-splitting incident surface 241, is reflected on the beam-splitting reflection surface 244 to form the first polarization light beam P1', P1'', P1''' (e.g. S linearly polarized light), and exits the polarization the beam splitter 240 through the first light-splitting exit surface 242. Then, the first polarization light beam P1', P1'', P1''' is projected on the light beam conversion portion 550 through the first polarization incident surface 551, is reflected on the first polarization reflection surface 553 and the second polarization reflection surface 554 in this order to form the fourth polarization light beam P4', P4'', P4''' (e.g., S linearly polarized light), and exits the light beam conversion portion 550 through the polarization exit surface 555.

As shown in FIG. 6C, the natural light P', P'', P''' from the backlight source 210 is projected on the polarization the beam splitter 240 through the light-splitting incident surface 241, is transmitted through on the beam-splitting reflection surface 244 to form the second polarization light beam P2', P2'', P2''' (P linearly polarized light), is reflected on the second polarization reflection surface 554 to form the fifth polarization light beam P5', P5'', P5''' (S linearly polarized light), and exits the light beam conversion portion 550 through the polarization exit surface 555.

As shown in FIG. 6B and FIG. 6C, both the fourth polarization light beam P4', P4'', P4''' and the fifth polarization light beam P5', P5'', P5''' exit the backlight module 500 through the polarization exit surface 555. In this case, the polarization exit surface 555 of the light beam conversion portion 550 constitutes the light exit surface of the backlight module 500. As shown, both the fourth polarization light beam P4', P4'', P4''' and the fifth polarization light beam P5', P5'', P5''' which exit through the polarization exit surface 555 are P linearly polarized light, i.e., have an identical polarization direction.

For example, when there is a gap between the first light-splitting exit surface 242 and the first polarization incident surface 551, there will be a gap between the fourth polarization light beam P4' shown in FIG. 6B and the fifth polarization light beam P5''' shown in FIG. 6C. As a result, there is a gap between the fourth polarization light beam P4' and the fifth polarization light beam P5''' which exit the polarization exit surface 555, and no polarization light beam is output at the gap. For example, when there is a gap between the second light-splitting exit surface 243 and the second polarization incident surface 552, no polarization light beam is output at the gap. Therefore, as shown in 6B and FIG. 6C, the first light-splitting exit surface 242 of the beam splitter 240 is closely bonded with the first polarization incident surface 551 of the light beam conversion portion 550, and the second light-splitting exit surface 243 of the beam splitter 240 is closely bonded with the second polarization incident surface 552 of the light beam conversion portion 550. As a result, the fourth polarization light beam P4 and the fifth polarization light beam P5 are uniformly distributed on the light exit surface of the backlight module 500, i.e., the polarization exit surface 555 of the light beam conversion portion 550. This provides a single linearly polarized light which is uniformly distributed on the light exit surface of the backlight module 500.

As shown in FIG. 7, in an embodiment, the first polarization incident surface 551 and the first polarization reflection surface 553 intersect at an angle α of 45 degrees, the first polarization reflection surface 553 and the second polarization reflection surface 554 intersect at an angle β of 90 degrees, and the second polarization incident surface 552 and the second polarization reflection surface 554 intersect at an angle γ of 45 degrees. As shown in FIG. 6B, result direction of the first polarization light beam P1 is rotated by 90 degrees after reflection from the first polarization reflection surface 553, and is further rotated by 90 degrees after reflection from the second polarization reflection surface 554, thus forming the fourth polarization light beam P4. As shown in FIG. 6C, result direction of the first polarization light beam P2 is rotated by 90 degrees after reflection from the second polarization reflection surface 554, thus forming the fifth polarization light beam P5. To this end, after the first polarization light beam P1 and the second polarization light beam P2 which are perpendicular with each other are projected on the light beam conversion portion 550, the resulting fourth polarization light beam P4 and fifth polarization light beam P5 have an identical result direction. Thus, the fourth polarization light beam P4', P4'', P4''' and the fifth polarization light beam P5', P5'', P5''' can be directly used as backlight for the liquid crystal display panel 100, and there is no need to arrange a light guide plate between the backlight module 500 and the liquid crystal display panel 100.

For example, the light beam conversion portion 550 is made from a transparent material with a refractive index of 1.414. When the light beam conversion portion 550 has a refractive index of 1.414, the first polarization light beam P1', P1'', P1''' (S linearly polarized light) is subject to total reflection on the first polarization reflection surface 553, i.e., is subject to total internal reflection in the light beam conversion portion 550, and a phase difference of π is introduced to form P linearly polarized light. Then, the first polarization light beam is subject to total reflection again on the second polarization reflection surface 554, and a phase difference of π is introduced to form the fourth polarization light beam P4', P4'', P4''' (S linearly polarized light), as shown in FIG. 6B. Moreover, the second polarization light beam P2', P2'', P2''' (P linearly polarized light) which is projected through the second polarization incident surface 552 is subject to total reflection on the second polarization reflection surface 554, and a phase difference of π is introduced to form the fifth polarization light beam P5', P5'', P5''' (S linearly polarized light), as shown in FIG. 6C.

In this embodiment, the first polarization light beam P1 is subject to total reflection on the first polarization reflection surface 553 and the second polarization reflection surface 554, and the polarization direction is rotated by 90 degrees in each total reflection. The second polarization light beam P2 is subject to total reflection on the second polarization reflection surface 554, and the polarization direction is rotated by 90 degrees. As a result, after the first polarization light beam P1 and the second polarization light beam P2 which have difference in polarization direction of 90 degrees pass through The light beam conversion portion 550, the fourth polarization light beam P4 and the fifth polarization light beam P5 are obtained which have an identical polarization direction, and which are S linearly polarized light in this case.

As shown in FIG. 7, the dimension La of the exit surface of the backlight source 210 equals to the dimension Lb of the light-splitting incident surface 241 of the beam splitter 240.

As for La>Lb, some light of the backlight source 210 will not be directed into the beam splitter 240, so that the utilization efficiency of light from the backlight source 210 reduces. By setting La=Lb, the utilization efficiency of light from the backlight source 210 is improved. As for La<Lb, as shown in the fourth polarization light beam P4''' and P4' of shown in FIG. 6B will move to P4'', and the fifth polarization light beam P5'" and P5' of shown in FIG. 6C will move to P5". Namely, polarization light beam is not output at two ends and the middle region of the polarization exit surface 555, and accordingly the light exit surface of the backlight module 500 provides a non-uniform distribution of light. By setting La=Lb, the light exit surface of the backlight module 500 has a uniform distribution of light.

As shown in FIG. 7, in an exemplary embodiment, the dimension Lc of the first light-splitting exit surface 242 equals to the dimension Ld of the first polarization incident surface 551, and the dimension Lb of the second light-splitting exit surface 243 equals to the dimension Lf of the second polarization incident surface 552, i.e., Lc=Ld and Lb=Lf.

When Ld<Lc, the first polarization incident surface 551 can not completely cover the first light-splitting exit surface 242, some of the first polarization light beam P1 which exits through the first light-splitting exit surface 242 will not enter the light beam conversion portion 550. Similarly, when Lf<Lb, the second polarization incident surface 552 can not completely cover the second light-splitting exit surface 243, some of the second polarization light beam P2 which exits through the second light-splitting exit surface 243 will not enter the light beam conversion portion 550. In this way, light from the backlight source is not made full use.

When Ld>Lc or Lf>Lb, polarization light beam is not output at two ends and the middle region of the polarization exit surface 555. This provides non-uniform distribution of light on the light exit surface of the backlight module 500.

Thus, by setting Lc=Ld and Lb=Lf, the utilization efficiency of light from the backlight source 210 is improved, and the light exit surface of the backlight module 500 has a uniform distribution of light.

As shown in FIG. 7, in an exemplary embodiment, the dimension Le of the polarization exit surface 555 is twice the dimension Lf of the second polarization incident surface 552, i.e., Le=2Lf. In other words, since α=γ=45 degrees and Lc=Ld=Lb=Lf, Le=2Ld=Ld+Lf, i.e., the polarization exit surface 555 has a dimension which is equal to a sum of the dimension Ld of the first polarization incident surface 551 and the dimension Lf of the second polarization incident surface 552. Referring to FIG. 6B and FIG. 6C, the fourth polarization light beam P4 and the fifth polarization light beam P5 occupy a half region of the polarization exit surface 555, respectively. This provides a uniformly distributed outgoing light on the exit surface (the polarization exit surface 555) of the backlight module 500.

In an exemplary embodiment, the light beam conversion portion 550 is a single optical element. In other embodiments, the light beam conversion portion 550 is formed by a combination of two right angled isosceles prisms.

The liquid crystal display device 2, 5 according to embodiments of the present disclosure are shown in FIGS. 2, 5. It comprises the liquid crystal display panel 100 and the backlight module 200, 500 in the above embodiments. The liquid crystal display device 2, 5 in embodiments of the present disclosure can be applied to various display devices, for example, any product or component with a display function like a mobile phone, tablet computer, TV, monitor, notebook computer, digital photo frame, navigator, electronic paper, or the like.

Embodiments of the present disclosure provide a backlight module and a liquid crystal display device. The backlight module comprises a backlight source, a beam splitter and a light beam conversion portion. The beam splitter converts light from the backlight source into a first and second polarization light beam. The light beam conversion portion converts the first polarization light beam into a third polarization light beam through total reflection, and outputs the second and third polarization light beam through a light exit side. Alternatively, the light beam conversion portion converts the first and second polarization light beam into a fourth and fifth polarization light beam through total reflection, and outputs the fourth and fifth polarization light beam through the light exit side. To this end, light from the backlight source is efficiently applied to irradiate a liquid crystal display panel, and the brightness of the liquid crystal display panel significantly improves.

Unless otherwise defined, the technical or scientific terms used in the present disclosure shall have the general meanings understandable for those ordinarily skilled in the field of the present disclosure. The wordings such as "first", "second" or similar used in the description and claims of the present disclosure shall not represent any order, number or importance, but are used for distinguishing different elements. Similarly, the words such as "an", "a" or similar shall not represent limitation of numbers, but mean existence of at least one. The phrases "couple", "connect" or similar are not limited to physical or mechanical connection, but also include electrical connection, no matter directly or indirectly. The phrases "upper", "lower", "left", "right" and etc. shall be used only to represent relative positions, wherein, when the absolute position of the described object is changed, the relative positions may be changed accordingly.

Apparently, the person with ordinary skill in the art can make various modifications and variations to the present disclosure without departing from the spirit and the scope of the present disclosure. In this way, provided that these modifications and variations of the present disclosure belong to the scopes of the claims of the present disclosure and the equivalent technologies thereof, the present disclosure also intends to encompass these modifications and variations.

What is claimed is:

1. A backlight module, comprising:
a backlight source;
a beam splitter, which is configured to convert light from the backlight source into a first polarization light beam and a second polarization light beam, wherein the first polarization light beam and the second polarization light beam are linearly polarized light with orthogonal polarization direction; and
a light beam conversion portion, which is configured to convert the first polarization light beam and the second polarization light beam into a fourth polarization light beam and a fifth polarization light beam through total reflection, respectively, wherein the fourth polarization light beam and the fifth polarization light beam are linearly polarized light with identical polarization direction,
wherein the light beam conversion portion comprises a first polarization incident surface, a second polarization incident surface, a first polarization reflection surface, a second polarization reflection surface, and a polarization exit surface; the first polarization light beam is projected on the light beam conversion portion through the first polarization incident surface, is subject to total reflection on the first polarization reflection surface and the second polarization reflection surface in this order to form the fourth polarization light beam; the second polarization light beam is projected on the light beam conversion portion through the second polarization incident surface, and is subject to total reflection on the second polarization reflection surface to form the fifth polarization light beam; and the fourth polarization light beam and the fifth polarization light beam exit through the polarization exit surface;

wherein the first polarization light beam has a first polarization state, and the second polarization light beam has a second polarization state; the first polarization light beam changes from the first polarization state to the second polarization state when being subject to total reflection on the first polarization reflection surface, and changes from the second polarization state to the first polarization state when being subject to total reflection on the second polarization reflection surface; the second polarization light beam changes from the second polarization state to the first polarization state when being subject to total reflection on the second polarization reflection surface; and the fourth polarization light beam and the fifth polarization light beam have the first polarization state; and wherein the light beam conversion portion is a single optical element, the first polarization incident surface and the first polarization reflection surface intersect at an angle of 45 degrees, the first polarization reflection surface and the second polarization reflection surface intersect at an angle of 90 degrees, the second polarization reflection surface and the polarization exit surface intersect at and angle of 45 degrees, the polarization exit surface and the second polarization incident surface intersect at an angle of 90 degrees, and the second polarization incident surface and the first polarization incident surface intersect at an angle of 90 degrees.

2. The backlight module of claim 1, wherein
the beam splitter is a polarization beam splitter, and comprises a light-splitting incident surface, a first light-splitting exit surface which is adjacent with the light-splitting incident surface, a second light-splitting exit surface which is opposite to the light-splitting incident surface, and a beam-splitting reflection surface;

light from the backlight source is projected on the beam splitter through the light-splitting incident surface, and is subject to total reflection on the beam-splitting reflection surface to form the first polarization light beam, and is transmitted through the beam-splitting reflection surface to form the second polarization light beam; and the first polarization light beam exits through the first light-splitting exit surface, and the second polarization light beam exits through the second light-splitting exit surface.

3. The backlight module of claim 2, wherein
the first polarization light beam exits through the beam splitter in a direction perpendicular with a direction in which the second polarization light beam exits through the beam splitter.

4. The backlight module of claim 1, further comprising a collimator which is arranged between the backlight source and the beam splitter.

5. The backlight module of claim 1, wherein the first polarization state is S linear polarization, and the second polarization state is P linear polarization.

6. The backlight module of claim 2, wherein
the first light-splitting exit surface of the beam splitter is closely bonded with the first polarization incident surface of the light beam conversion portion; and
the second light-splitting exit surface of the beam splitter is closely bonded with the second polarization incident surface of the light beam conversion portion.

7. The backlight module of claim 1, wherein the light beam conversion portion is made from a transparent material and has a refractive index of 1.414.

8. A liquid crystal display device, comprising a liquid crystal display panel and the backlight module of claim 1.

* * * * *